Dec. 23, 1969           A. RIELI ET AL                3,485,313
        SEAT AND CONTROL ARRANGEMENT FOR LOW SILHOUETTE VEHICLE
Original Filed May 19, 1967                          2 Sheets-Sheet 1

ANTHONY RIELI
GORDON R. McNAUGHTON
INVENTORS

BY John Paul Robinson Jr.
ATTORNEY

Dec. 23, 1969 A. RIELI ET AL 3,485,313
SEAT AND CONTROL ARRANGEMENT FOR LOW SILHOUETTE VEHICLE
Original Filed May 19, 1967 2 Sheets-Sheet 2

ANTHONY RIELI
GORDON R. McNAUGHTON
INVENTORS
BY John Paul Robinson Jr.
ATTORNEY

United States Patent Office 3,485,313
Patented Dec. 23, 1969

3,485,313
SEAT AND CONTROL ARRANGEMENT FOR
LOW-SILHOUETTE VEHICLE
Anthony Rieli, Grosse Pointe, and Gordon Richard
McNaughton, Royal Oak, Mich., assignors to LTV
Aerospace Corporation, Dallas, Tex., a corporation of Delaware
Original application May 19, 1967, Ser. No. 639,866, now
Patent No. 3,435,798, dated Apr. 1, 1969. Divided and
this application May 13, 1968, Ser. No. 728,528
Int. Cl. B62d 11/00
U.S. Cl. 180—6.2
4 Claims

ABSTRACT OF THE DISCLOSURE

A vehicle having propulsion means, wherein a plurality of traction members are rotatably driven by a transmission mechanism drivingly connected to a variable-speed transmission which is operatively associated with a prime mover. The occupant-carrying zone is provided with a seating structure having a pair of pivotal backrest portions which can be changed at will, to enable the driver and/or drivers to change from a forwardly to a rearwardly facing position, within a minimum of time and with a minimum of bodily relocation, to actuate an adjacent steering and driving mechanism.

Figure 1:
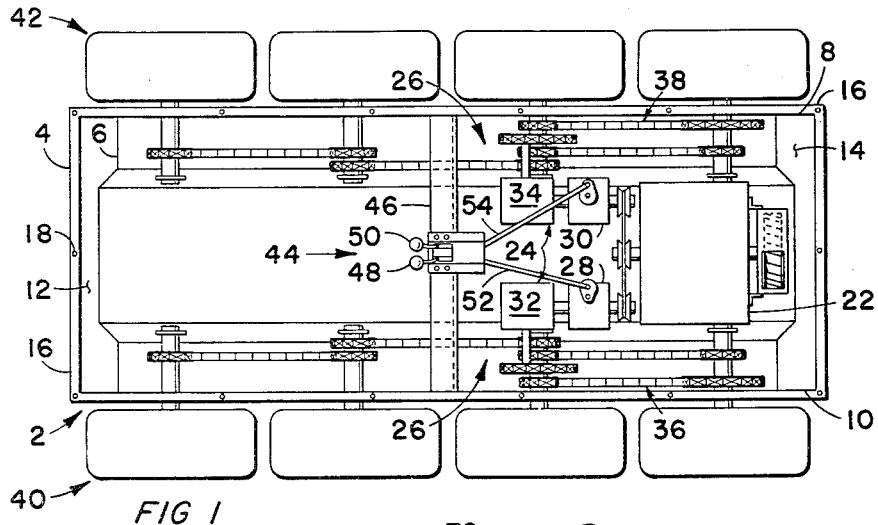

This application is a division of copending application Ser. No. 639,866, filed May 19, 1967, now U.S. Patent No. 3,435,798.

This invention relates to a low-silhouette vehicle especially fitted to serve as a highly mobile carrier which is capable of maneuvering in substantially any environment, and particularly to a seat and control arrangement for such a vehicle.

In the past, low-silhouette vehicles have been designed for operating in restricted and confined areas such as mines, tunnels, or other environments wherein overhead clearances between the operating vehicle and other structural or naturally occurring elements necessarily were at an absolute minimum. With this limitation in mind, vehicles were designed in which the vehicle operator's station was positioned to one side of the vehicle and between the front and rear traction wheels. A pair of oppositely facing steering wheels and associated mechanism were generally located centrally of the operator's station, whereby the operator would assume a substantially supine position to operate the vehicle when traveling in one direction. When it was desired to operate the vehicle in the opposite direction, the operator was required to get up and move around to the other driving station opposite his previous driving station to enable him to operate the vehicle in the opposite direction. In these prior-art vehicles, the operator's station was a substantially horizontally extending platform with one vertically adjustable backrest support mounted adjacent each end thereof and in opposed relationship; thus, either one or the other of these backrest members provided support for the operator's back in either of the reclined positions which the vehicle operator desired to assume. When the operator was in one substantially supine position, his back was supported by an elevated backrest, and the opposed backrest in front of the operator could be collapsed to provide a substantially unobstructed view for the operator. These prior-art seating arrangements were extremely uncomfortable and fatiguing. Also, while the operator was required to get up and change driving stations when the opposite direction of travel was desired, under certain conditions and environments such changes of driving stations were impractical and/or virtually impossible. In addition, complicated dual steering mechanisms were employed, and these frequently malfunctioned.

An object of the invention is to provide a low-silhouette vehicle wherein an operator of the vehicle can change from a forwardly to a rearwardly facing position within a minimum of time and with a minimum of bodily relocation.

Another object is to provide a vehicle of the above character in which a control assembly located in a single position in the vehicle is readily operated by a passenger while facing either forwardly or rearwardly within the vehicle.

A further object is to provide a vehicle of the character above stated and in which the control assembly is readily operable by either of a pair of passengers in the vehicle while facing either forwardly or rearwardly in the vehicle.

Still another object is to provide a vehicle of the above character in which, in at least one of the positions mentioned, the body of the vehicle operator is substantially prone and has minimum extension above the vehicle.

Other objects and advantages will be apparent from the specification and claims and from the accompanying drawing illustrative of the invention.

Figure 2:
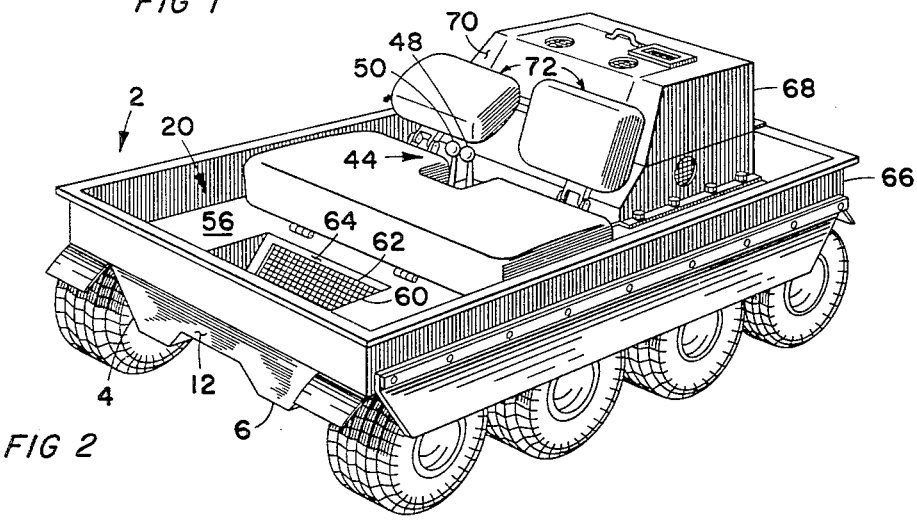
Figure 3:
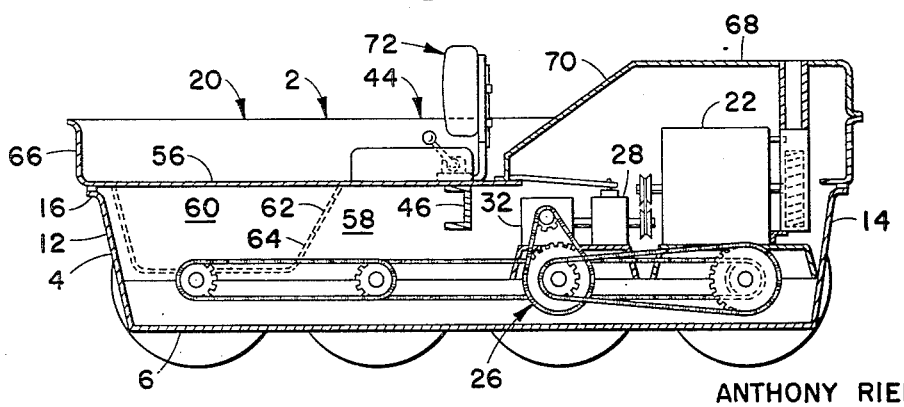
Figure 4:
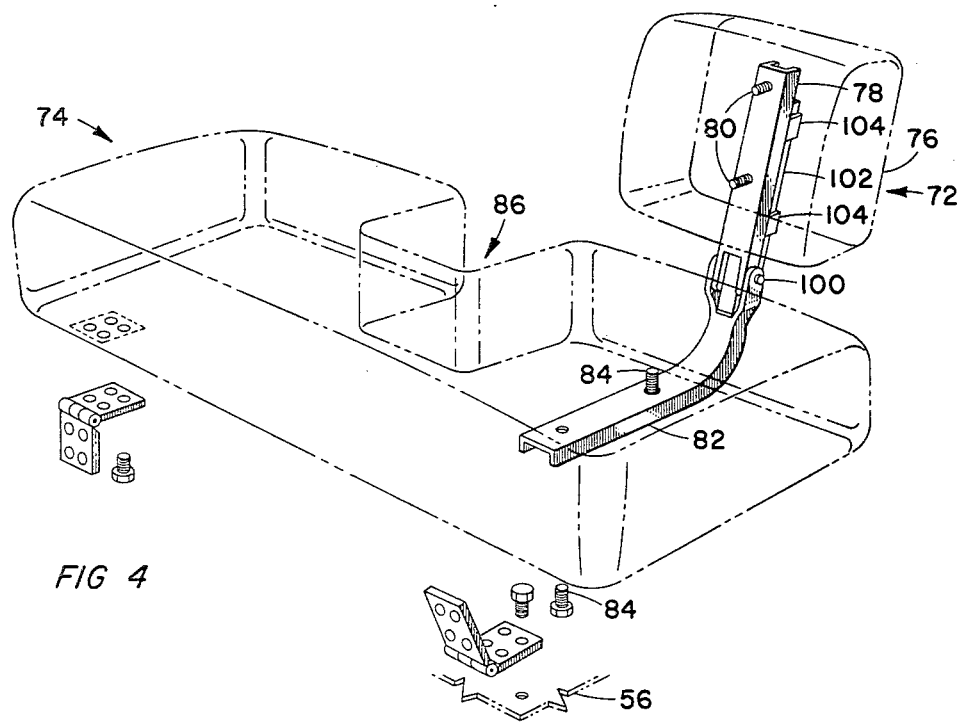
Figure 5:
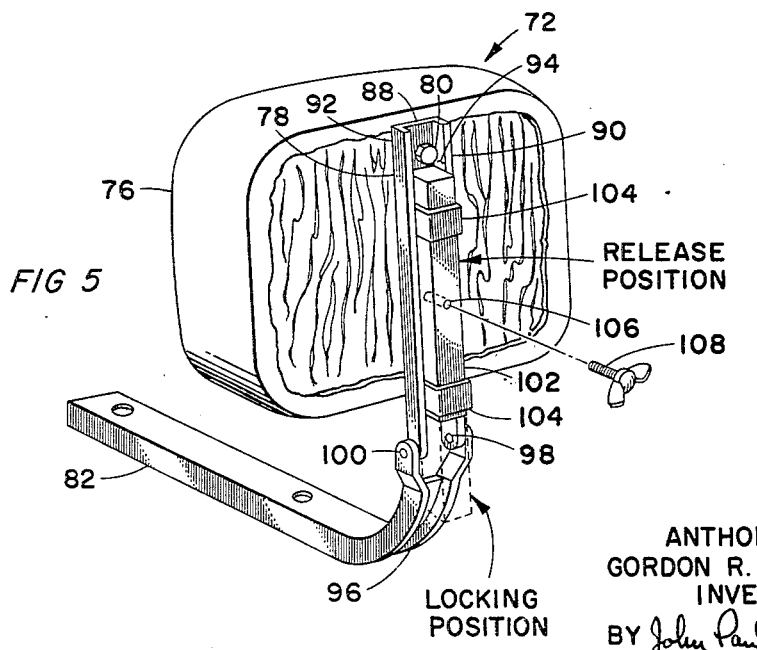

In the drawing:

FIGURE 1 is a plan view, with the floor plate removed, of the vehicle showing the details of the propulsion means, wherein a plurality of traction members are rotatably driven by a transmission mechanism which is drivingly connected to an infinitely variable-speed transmission operatively associated with a prime mover, FIGURE 2 is a perspective view of the vehicle disclosing the arrangement of the steering and speed control device located substantially interjacent a pair of adjustable backrest structures disposed in side-by-side relationship, togther with other features, FIGURE 3 is a longitudinal sectional view in elevation of the vehicle, FIGURE 4 shows schematically the relationship of the bottom seat structure to the backrest structure, and FIGURE 5 is an enlarged, perspective view of the backrest structure disclosing the details of the means for releasably locking the backrest member in a substantially vertical position.

Certain terminology will be used in the following description for convenience in reference only and is not intended to be limiting. The words "upwardly," "downwardly," "rightwardly" and "leftwardly" will designate directions in the drawing to which reference is made. The words "forwardly" and "rearwardly" will refer to the normal forward and reverse direction of travel of the vehicle, such directions being to the left and right, respectively. The words "inwardly" and "outwardly" will refer to directions toward and away from, respectively, a geometric axis of the vehicle. Said terminology will include the words specifically mentioned, derivatives thereof and words of similar import.

Referring now to the drawing, there is shown in FIGS. 1 and 2 a motor vehicle having a lightweight, elongate vehicle body assembly 2 including a lower, outer shell or hull 4 extending generally the entire length and for a substantial portion of the width of the body assembly. The lower shell 4 comprises a bottom wall 6 which interconnects two spaced sidewalls 8 and 10 and two spaced endwalls 12 and 14. The spaced endwalls 12 and 14 mutually diverge outwardly, from the bottom wall 6, to strengthen the lower shell 8 and to reduce resistance to forward or rearward vehicular movement when the vehicle is being operated in an unconsolidated or overgrown environment such as a swamp, bog, tidal mud flats, rice paddies, etc.

The upper periphery or edge portion of the lower shell 4 has, for example, an outwardly projecting flange member 16 which contains a plurality of spaced apertures 18 adapted to receive conventional fastener means (not shown) which secure a substantially rigid floor assembly 20 (FIG. 2) to the lower shell 4.

A common power plant or prime mover 22 (FIG. 1) which, for example, is a conventional internal-combustion engine, is mounted on and carried by the lower shell 4. The prime mover 22 is drivingly connected to a transmission means that comprises an infinitely variable-speed transmission means 24 operatively associated with a transmission mechanism 26 for varying the speed of the vehicle, the connection being effected through first and second infinitely variable-displacement, reversing-swashplate, piston pumps 28 and 30, respectively. The pumps 28 and 30 are operatively and respectively connected through conventional, hydraulic conduit means (not shown) to first and second, fixed-displacement hydraulic motors 32 and 34 respectively. Each motor 32, 34 is operatively coupled, through a first or second power drive train 36 or 38, to a first or second series 40 or 42, of driven traction elements rotatably mounted on respective, opposite sides of the lower outer shell member 4. The power drive trains 36 and 38 are of conventional design for drivingly connecting the variable-speed transmission means 32, 34 to the traction elements 40, 42 and hence will require no further description.

A control assembly 44 (FIG. 1) is attached to a structural member 46 (FIG. 2) which is disposed substantially equidistant between end-walls 12 and 14 and extends between and has opposite ends connected to sidewalls 8 and 10. The control assembly 44 includes a pair of closely spaced, pivotally mounted control levers 48 and 50 which are connected, such as by linkages 52 and 54, to the swashplates of the infinitely variable displacement pumps 28 and 30 for controlling the amount of oil-flow to the hydraulic motors 32 and 34 and thereby determining the respective speeds and directions of rotation of the first and second series of driven traction elements 40, 42.

As illustrated in FIG. 3, the floor assembly 20 includes a floor plate 56 which is spaced from and substantially co-extensive with the bottom wall 6 for defining a lower compartment 58 therebetween for receiving the power transmission means, a portion of a prime mover 22, and associated and/or auxiliary components and parts operatively associated therewith. A footwell 60 (FIG. 2) is disposed in the front portion of the floor plate 56 and has an elongate, cooling air inlet opening 62 in at least one wall portion 64. An upstanding sidewall 66 extends continuously about the outer periphery of floor plate 56.

A cover assembly or prime mover housing 68, as illustrated in FIGS. 2 and 3, has a rearwardly and upwardly inclined wall portion 70 which limits the backward pivotal movement of both backrest structures 72.

The seat structure (FIGS. 4, 5) comprise a bottom seat structure or arrangement 74 and at least one pivotally adjustable backrest structure 72 disposed adjacent thereto. In the preferred embodiment, two backrest structures 72 are positioned in a substantially side-by-side relationship. Each backrest structure generally includes a backrest member 76 attached to a first structural support or channel member 78 by conventional fasteners 80 and is pivotally movable therewith about a generally horizontal axis. A second structural support or channel member 82 is secured to the bottom seat structure 74 by conventional fastener means 84. The bottom seat structure 74 is attached to floor plate 56 by any desired means and has a recess 86 disposed between the spaced backrest structures 72 for receiving the control assembly 44. The bottom seat structure 74 illustrated is a unitary structure; however, this bottom seat structure may include two spaced seat structures.

In one embodiment, the first and second structural support members 78 and 82, as shown in FIG. 5, are formed from conventional channel members. The first channel member 78 has a web portion 88 interconnecting spaced, substantially parallel, outwardly extending leg or flange portions 90 and 92 that define a passageway 94. Likewise, second channel member 82 defines a passageway 96. The flanges or legs of the first channel member 78 interdigitate, at the lower end of the latter, with the flanges of the second channel member 82 and are pivotally interconnected, as by pins 98, 100, thus establishing a substantially horizontal pivot axis or a means pivotally interconnecting the first and second structural support members 78, 82 for permitting pivotal movement of backrest structure 72 with respect to bottom seat structure 74.

Means are provided for releasably locking the pivoting means. For example, a member or bar 102 is snugly and slidably received in passageway 94, and there is provided a plurality of spaced guide means 104 carried by the first structural member 78 for maintaining the locking member 102 in a continuously aligned relationship with passageway 94. The bar 102 is movable between a "release" position (as shown in solid lines in FIG. 5) for permitting pivotal movement between the first and second structural support members 78 and 82 and a locking position (shown in broken lines) for releasably locking the first and second structural support members 78 and 82 against pivotal movement. The lower portion of locking member 102 is so constructed and arranged as to be slidably received in passageway 96 of the second structural support 82 for locking the backrest 72 in its substantially upright position.

Each locking member 102 has, operatively associated therewith, a means for retaining the locking member 102 in the position to which it is moved. For example, the retaining means includes an internally threaded bore 106 extending transversely through member 102 and having a longitudinal axis disposed substantially normal to web portion 88. An externally threaded bolt or member 108 is received in and threadedly engages the complementary threads in bore 106. When the member 108 is tightened into bore 106, its inner end-portion bears against web portion 88 and simultaneously forces locking member 102 outwardly into a frictionally engaging or retaining relationship with guide means 104, whereby locking member 102 is substantially frictionally retained or restrained in the position to which it is moved.

Moreover, the outer end-portion of externally threaded member 108 cooperates with guide means 104 to limit the sliding movement of locking member 102 relative to the first structural support 78.

During normal operation of the vehicle, the operator makes a simultaneous, coordinated movement of the levers 48 and 50 (FIGS. 1, 2) to effect a forward or reverse linear travel of the vehicle. With the levers in a substantially vertical position, the infinitely variable-speed transmission means 24 is in neutral.

Steering of the vehicle is accomplished by effecting a differential in the speeds of the first and second series of traction elements 40, 42. When the wheels 40 on one side of the vehicle are traveling, for example, at a greater angular velocity than the wheels 42 on the other side, the vehicle will tend to turn toward the slower-rotating side. Pivot-steering is accomplished by reversing the direction of rotation of the elements 40 or 42 on one side of the vehicle and rotating the elements 40 or 42 on the other side in the opposite direction.

By virtue of the interrelationship of the bottom seat structure, backrest, and control levers 48 and 50, the operator may elect to drive the vehicle simply, quickly, and easily either forwardly or rearwardly without having to move from one driving station to another driving station. Thus, a pair of individual, spaced backrest structures 72 are mounted in such a manner as to be pivotal about a substantially horizontal axis, whereby they can readily be moved between a substantially vertical position and a reclined position. The closely spaced control levers 48 and 50 are disposed between the pair of backrest structures 72, which positioning thereof allows either or both operators individually or collectively to drive and steer the low-silhouette vehicle. The ease with which backrest structures 72 can be pivoted backwardly away from bottom seat structure 74 permits one and/or both occupants of the vehicle readily to change their direction of facing for operating the vehicle in the desired direction of travel. This ease of movement by both operators is normal and relaxed and far less physically fatiguing than other prior-art seating arrangements. Moreover, the operator is merely required to turn or rotate his body 180°, when moving from a substantially vertical to a substantially reclined position, in order to face in opposite directions for driving and steering the vehicle.

From the above description, it is readily apparent the present seat and control arrangement is effective in rendering a low-silhouette vehicle especially fitted to serve as a highly mobile logistics carrier. Such vehicles must have high maneuverability over marginal terrain to permit rapid conveyance of large amounts of material and/or equipment, over marginally passable topography, to a predetermined point of operation.

While only one embodiment of the invention has been described in detail herein and shown in the accompanying drawing, it will be evident that various modifications are possible in the arrangement and construction of its components without departing from the scope of the invention.

What is claimed is:

1. A highly mobile, low-silhouette vehicle comprising:
   an elongate vehicle body assembly having a first series of traction elements mounted on one side of the body assembly and a second series of traction elements mounted on the other side thereof;
   a transmission mechanism drivingly connected to both of said series of traction elements;
   a variable-speed transmission means drivingly connected to said transmission mechanism for varying the speed thereof;
   a prime mover drivingly connected to the variable-speed transmission means to deliver power thereto;
   a seat assembly carried by the vehicle body assembly and having at least two spaced backrest structures in a substantially side-by-side relationship with means permitting each backrest structure to pivot between a substantially vertical position and a reclined position for allowing either or both of the vehicle passengers to ride in one position facing one end of the vehicle body assembly or to ride in another position facing the other end of the vehicle body assembly;
   a support structure affixed to the body assembly adjacent the seat assembly, the support structure and seat assembly being relatively positioned such that, upon the backrest structures pivoting to their respective reclined positions, the support structure is interposed between the backrest structures and the vehicle body assembly in contact with the backrest structures for preventing further pivotal movement of the backrest structures from the upright position; and
   a control assembly operatively connected to the variable-speed transmission for selectively varying the speed thereof;
   said control assembly being positioned substantially interjacent the two spaced backrest structures for permitting either passenger to actuate the control assembly to regulate the motion of the vehicle.

2. The low-silhouette vehicle recited in claim 1, wherein said seat assembly has means for releasably locking each backrest structure against pivotal movement.

3. The low-silhouette vehicle recited in claim 1, said transmission mechanism comprising a first power drive train drivingly connected to the first series of traction elements and a second power drive train drivingly connected to the second series of traction elements for independently driving the first and second series of traction elements.

4. The low-silhouette vehicle recited in claim 2, wherein said means for releasably locking each backrest structure against pivotal movement comprises, at each backrest structure, a rigid, elongated member slideably mounted on the respective backrest structure and movable between an extended position for locking the backrest structure in the upright position and a retracted position for permitting pivotal movement of the backrest structure.

References Cited

UNITED STATES PATENTS

| | | | |
|---|---|---|---|
| 2,446,242 | 8/1948 | Orshansky | 180—6.48 |
| 2,634,008 | 4/1953 | Osgood. | |
| 2,642,144 | 6/1953 | Brewer | 180—6.48 X |
| 2,732,022 | 1/1956 | Lapsley | 180—6.5 X |
| 3,204,713 | 9/1965 | Shanahan et al. | 180—6.7 X |
| 3,266,589 | 8/1966 | Harris | 180—77 X |

LEO FRIAGLIA, Primary Examiner

JOHN A. PEKAR, Assistant Examiner

U.S. Cl. X.R.

180—77